United States Patent
Zeng et al.

(10) Patent No.: US 10,429,978 B2
(45) Date of Patent: Oct. 1, 2019

(54) TOUCH PANEL STRUCTURE

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventors: Jhe-Wei Zeng, Guangdong (CN); Yue-Feng Yang, Guangdong (CN); Po-Lin Chen, Guangdong (CN); Ju-Xiang Liu, Guangdong (CN); Yen-Heng Huang, Guangdong (CN)

(73) Assignees: Interface Technology (Chengdu) Co., Ltd., Sichuan (CN); Interface Optoelectronics (ShenZhen) Co., Ltd., Guangdong (CN); General Interface Solution Limited (TW)

( * ) Notice: Subject to any disclaimer, the term of this patent is extended or adjusted under 35 U.S.C. 154(b) by 0 days.

(21) Appl. No.: 15/873,877

(22) Filed: Jan. 17, 2018

(65) Prior Publication Data
US 2019/0107908 A1    Apr. 11, 2019

(30) Foreign Application Priority Data
Oct. 11, 2017   (CN) .......................... 2017 1 0941834

(51) Int. Cl.
*G06F 3/044*   (2006.01)
*G06F 3/041*   (2006.01)

(52) U.S. Cl.
CPC .......... *G06F 3/0412* (2013.01); *G06F 3/0445* (2019.05); *G06F 2203/04112* (2013.01)

(58) Field of Classification Search
CPC ...................... G06F 3/044; G06F 2203/04112
See application file for complete search history.

(56) References Cited

U.S. PATENT DOCUMENTS

| | | | | |
|---|---|---|---|---|
| 2014/0299361 A1* | 10/2014 | Nakamura | ............. | G06F 3/044 174/253 |
| 2015/0242025 A1* | 8/2015 | Cok | ........................ | G06F 3/046 29/622 |

* cited by examiner

*Primary Examiner* — Michael Pervan
(74) *Attorney, Agent, or Firm* — CKC & Partners Co., LLC

(57) ABSTRACT

The present disclosure provides a touch panel structure, which includes a conductive channel region and a second dummy metal pattern. The conductive channel region includes a metal mesh and a first dummy metal pattern. The metal mesh is a conductive channel. The first dummy metal pattern is intersecting the metal mesh and has at least one breakpoint at every point of intersection with the metal mesh. The metal mesh is separated from the first dummy metal pattern to be insulated from the first dummy metal pattern at the at least one breakpoint. The second dummy metal pattern is disposed on the both sides of the conductive channel region.

10 Claims, 4 Drawing Sheets

TOUCH PANEL STRUCTURE

CROSS-REFERENCE TO RELATED APPLICATION

This application claims priority to Chinese Application Serial Number 201710941834.6, filed Oct. 11, 2017, which is herein incorporated by reference.

BACKGROUND

Field of Invention

The present invention relates to a touch panel structure. More particularly, the present invention relates to a metal mesh touch panel structure.

Description of Related Art

As electric products rapidly developing, touch devices are widely used in many kinds of products. As shown in FIG. 1, a touch device comprises a cover plate 110, an adhesive layer 120 and a touch layer 130, in which the touch layer 130 includes sensing electrodes.

Nowadays, touch devices using metal meshes as sensing electrodes have been developed. A variety of touch assistant devices have been developed one after another with the growth of technology, for example, stylus pens, also associated with higher requirements of the touch identification accuracy. At present, the conventional design of the metal mesh cannot meet the above-mentioned needs. However, increasing sensing pattern channel would make the metal mesh be observed by users easily, which increases the visibility of the sensing electrodes and affects the user experience. Therefore, a new design of the metal mesh is needed.

SUMMARY

One aspect of the present disclosure is to provide a touch panel structure, comprising a conductive channel region and a second dummy metal pattern, wherein the conductive channel region comprises a metal mesh and a first dummy metal pattern. The metal mesh is a conductive channel. The first dummy metal pattern is intersecting the metal mesh, and has at least one breakpoint at every point of intersection with the metal mesh. The metal mesh is separated from the first dummy metal pattern to be insulated from the first dummy metal pattern at the at least one breakpoint. The second dummy metal pattern is insulated from and disposed on two sides of the conductive channel region.

In accordance with an embodiment of the touch panel structure of the present disclosure, further comprising a substrate, wherein the conductive channel region and the second dummy metal pattern are disposed on at least one surface of the substrate.

In accordance with an embodiment of the touch panel structure of the present disclosure, the first dummy metal pattern comprises at least one metal line.

In accordance with an embodiment of the touch panel structure of the present disclosure, the second dummy metal pattern comprises at least one breakpoint.

In accordance with an embodiment of the touch panel structure of the present disclosure, the second dummy metal pattern is insulated from the metal mesh.

In accordance with an embodiment of the touch panel structure of the present disclosure, the second dummy metal pattern is insulated from the first dummy metal pattern.

In accordance with an embodiment of the touch panel structure of the present disclosure, a line width of the metal mesh is less than or equal to 5 μm.

In accordance with an embodiment of the touch panel structure of the present disclosure, a line width of the first dummy metal pattern or the second dummy metal pattern is less than or equal to 5 μm.

In accordance with an embodiment of the touch panel structure of the present disclosure, a shape of a metal mesh unit of the metal mesh is rhombus.

In accordance with an embodiment of the touch panel structure of the present disclosure, the first dummy metal pattern is consisted of repeated rhombus.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
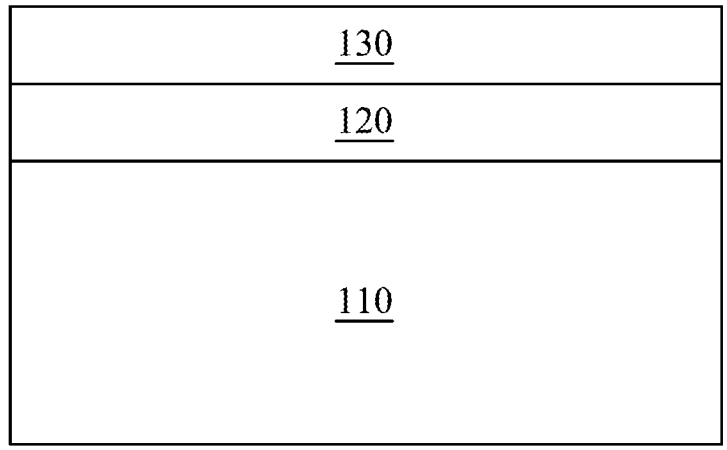
FIG. 1 is a cross-sectional view illustrating a conventional touch panel.

Reference will now be made in detail to the present embodiments of the disclosure, examples of which are illustrated in the accompanying drawings. Wherever possible, the same reference numbers are used in the drawings and the description to refer to the same or like parts.

The following disclosure provides many different embodiments, or examples, for implementing different features of the provided subject matter. Specific examples of components and arrangements are described below to simplify the present disclosure. These are, of course, merely examples and are not intended to limit. For example, the formation of a first feature over a second feature in the description that follows may include embodiments in which the first and second features are formed in direct contact, and may also include embodiments in which additional features are disposed between the first and second features, such that the first and second features are not in direct contact. In addition, the present disclosure may repeat reference numerals and/or letters in the various examples. This repetition does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In order to improve the problem of the visibility of the sensing electrodes increasing when enlarging the sensing pattern channel, the present disclosure provides a configuration of the metal mesh and the dummy pattern, which can decrease the visibility of the metal mesh significantly.

Figure 2:
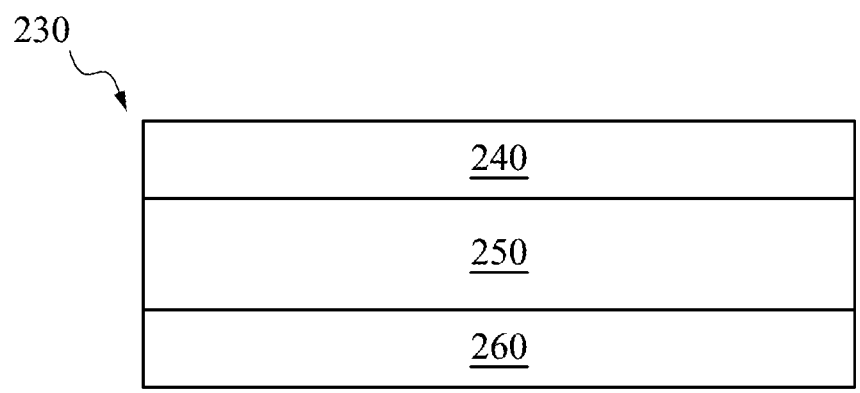
FIG. 2 is a cross-sectional view illustrating the touch layer of the touch panel structure according to one embodiment of this disclosure.

FIG. 2 is a cross-sectional view illustrating a touch layer of a touch panel structure. A touch layer 230 includes a first metal mesh layer 240, a substrate 250 and a second metal mesh layer 260. The first metal mesh layer 240 and the second metal mesh layer 260 include metal meshes (not shown) which are used for sensing touch points. The substrate 250 is disposed between the first metal mesh layer 240 and the second metal mesh layer 260. The substrate 250 is transparent, and may be a hard substrate or a flexible substrate. The material of the hard substrate may be glass, tempered glass, sapphire glass, ceramic or other suitable materials in certain embodiments. The material of the flexible substrate may be polymer, such as polyethylene (PE), polypropylene (PP), polystyrene (PS), polymethylmethacrylate (PMMA), polyvinyl chloride (PVC), nylon, polycarbonate (PC), polyurethane (PU), polytetrafluoroethylene (PTFE), polyethylene terephthalate (PET), polyimide (PI), acrylic resin or a mixture of polymethyl methacrylate and polycarbonate in accordance with some embodiments in the disclosure. The touch panel using the above-mentioned flexible substrates may be flexible, and therefore is suitable for a variety size of flexible touch screen.

Figure 3:
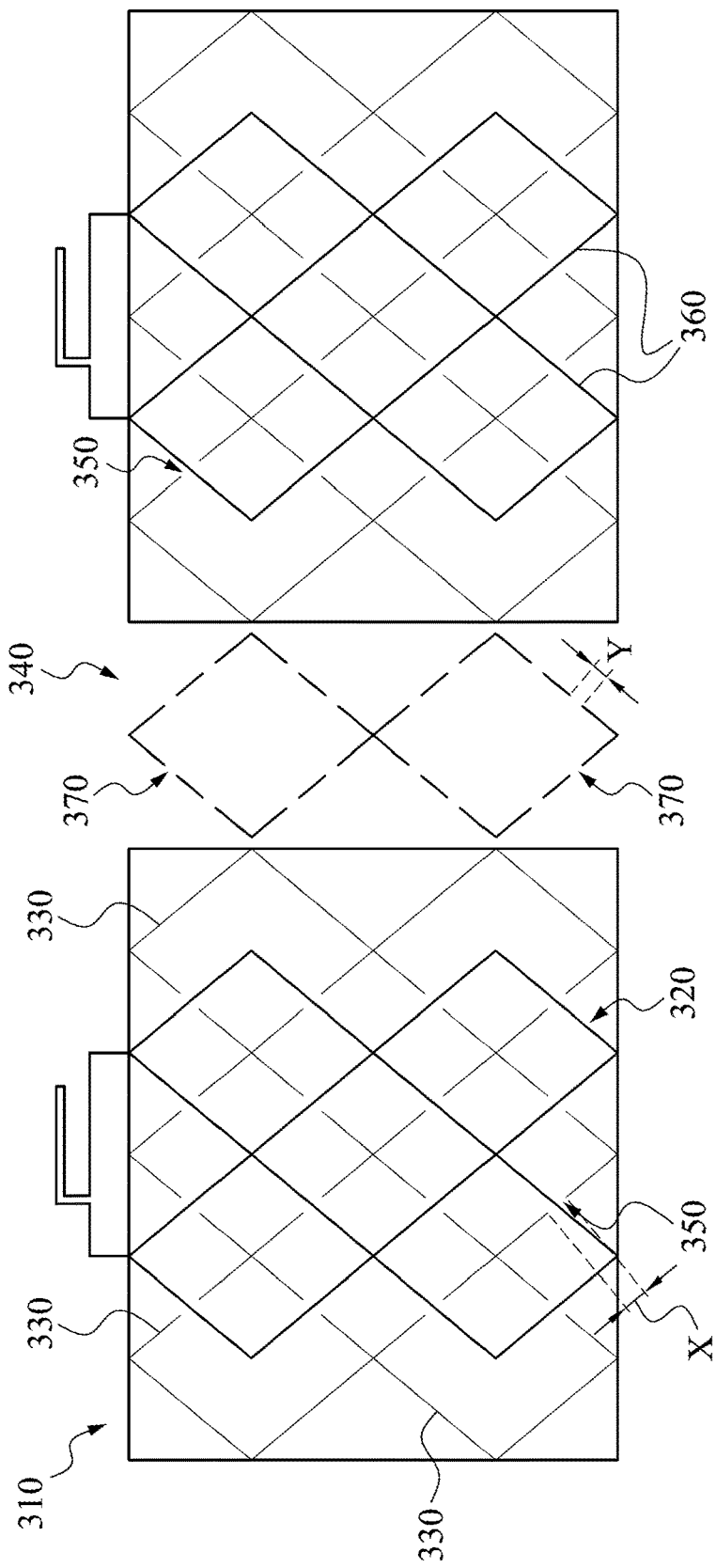
FIG. 3 is a top view illustrating a portion of the touch layer according to one of the embodiments of the present disclosure.

FIG. 3 is a top view illustrating a portion of the touch layer in accordance with one of the embodiments of the present disclosure, which is a partial structure of the metal mesh touch panel. It is noted that FIG. 3 merely illustrates a partial top view of the first metal mesh layer 240 or the second metal mesh layer 260 in FIG. 2. The first metal mesh layer and the second metal mesh layer include a plurality of conductive channel regions 310 and a plurality of second dummy metal patterns 340. The conductive channel region 310 includes a metal mesh 320 and a first dummy metal pattern 330, in which the first dummy metal pattern 330 is electrically insulated from the metal mesh 320 and the first dummy metal pattern 330 is intersecting the metal mesh 320 at every point of intersection with the metal mesh 320. In addition, the metal mesh 320 is separated from the first dummy metal pattern 330 to be insulated from the first dummy metal pattern 330 at the breakpoints.

In some embodiments, the metal mesh 320 includes a plurality of first metal lines and a plurality of second metal lines, in which the first metal lines extend along a first direction, and the second metal lines extend along a second direction. The first direction is different from the second direction. In some embodiments, the first dummy metal pattern 330 includes a plurality of third metal lines extending along a third direction, in which the third direction may be same as or different from the first direction and the second direction. The first dummy metal pattern 330 further includes a plurality of second dummy metal lines extending along a forth direction different from the third direction in the other embodiments. It is noted that the first dummy metal lines and the second dummy metal lines may be straight lines or curves. The figures in the present disclosure are merely exemplary and not intended to limit the shapes. A plurality of breakpoints disposed at the intersection of the extension direction of the first dummy metal lines and the metal mesh 320 and the intersection of the extension direction of the second dummy metal lines and the metal mesh 320, in order to make the metal mesh 320 electrically insulated from the first dummy metal pattern 330.

The metal mesh 320 may be a conductive channel used for sensing touch points. The metal mesh 320 includes a plurality of metal mesh units 360. The lengths of each sides may be the same or different in the area surrounded by the metal mesh unit 360. The area surrounded by the metal mesh unit 360 may be polygon, such as triangle, quadrilateral, pentagon or hexagon, etc., and may be regular or irregular shape in the metal mesh 320. In some embodiments, the area surrounded by the metal mesh unit 360 is a rhombus having two pairs of parallel sides, and four sides of which have equal lengths. The area surrounded by the metal mesh unit 360 is rectangle in another embodiment. In another embodiment, the area surrounded by the metal mesh unit 360 is irregular shape, meaning that the sides of the metal mesh unit 360 may be curves.

It is necessary to evaluate whether the metal mesh 320 may affect the users watching the images that the display device shows because the material of the conductive metal lines is opaque. The visibility of the metal lines of the metal mesh 320 has to be decreased to a level that the users cannot easily observe. In general, the thicker the lines are, the higher the visibility is. The line widths of the metal mesh 320 are less than or equal to 5 µm in an embodiment. The visibility falls in the allowable range in the circumstances of the line widths being less than or equal to 5 µm. The better line width is less than or equal to 3 µm, more better is less than or equal to 1 µm.

It is noted that, as mentioned above, it is necessary to form a breakpoint 350 at the intersection of the metal mesh 320 and the first dummy metal pattern 330 in order to make the metal mesh 320 and the first dummy metal pattern 330 be able to be electrically insulated from each other. In other words, the metal mesh 320 and the first dummy metal pattern 330 are substantially not in contact with each other, and therefore both of them are insulated from each other. More particularly, the first dummy metal pattern 330 includes at least one breakpoint 350. In certain embodiments, the metal mesh 320 and the first dummy metal pattern 330 are coplanar. The metal mesh 320 may be formed by direct metal ink screen printing in certain embodiments. The metal mesh 320 may be formed by deposition, sputtering or coating, followed by lithography and etching process in other embodiments.

The material of the first dummy metal pattern 330 may be copper, silver, gold, tin, silver halide or combinations thereof in certain embodiments. The first dummy metal pattern 330 may include repeated regular polygon or irregular polygon, such as triangle, quadrilateral, pentagon or hexagon in certain embodiments. In an embodiment, the first dummy metal pattern 330 is made up of repeated rhombuses. In certain embodiments, the first dummy metal pattern includes at least one metal line. In some other embodiments, the first dummy metal pattern 330 includes repeated rectangles. It is noted that the first dummy metal pattern 330 would not affect the interpretation of metal mesh for touch action during the operation of the touch panel because of the electrical insulation between the first dummy metal pattern 330 and the metal mesh 320.

Once the conductive channel region 310 is widened, the visibility risk of the metal mesh 320 increases. The first dummy metal pattern 330 is intersecting the metal mesh 320 so that the visibility of the metal mesh 320 can be reduced and thus make users difficult to perceive the metal mesh 320 when using the touch devices and improve the user experience.

The conductive channel region disposed on the top side of the substrate and the conductive channel region disposed on the bottom side of the substrate may be the same or different. In other words, the metal mesh and the first dummy metal pattern disposed on the top side of the substrate may be same as or different from the metal mesh and the first dummy metal pattern disposed on the bottom side of the substrate, respectively. The metal mesh disposed on the top side of the substrate may be aligned with the metal mesh disposed on the bottom side of the substrate in the case of the patterns of the metal meshes being the same. In certain embodiments, the metal mesh disposed on the top side of the substrate may not be aligned with the metal mesh disposed on the bottom side of the substrate. In certain embodiments, the first dummy metal pattern disposed on at least one side of the substrate.

Second dummy metal patterns 340 are disposed on the two sides of the metal mesh 320 and the first dummy metal pattern 330. More particularly, the second dummy metal patterns 340 are positioned at both sides of the first dummy metal pattern 330. It is noted that all elements in the same sensing layer of the touch layer are coplanar in certain embodiments. That is to say, the metal mesh 320, the first dummy metal pattern 330 and the second dummy metal pattern 340 are coplanar. The metal mesh 320 is insulated from the second dummy metal pattern 340, and the first dummy metal pattern 330 adjacent to the second dummy metal pattern 340 is also insulated from the second dummy metal pattern 340. In other words, the metal mesh 320, the first dummy metal pattern 330 and the second dummy metal pattern 340 are not electrically connected to each other.

A void existing between the conductive channel regions 310 would make users easily perceive the metal mesh 320, unfavorably affecting the user experience. For the purpose of solving the issue, the present disclosure provides the second dummy metal pattern 340 filling the voids on the both sides of the conductive channel region 310. It is noted that the second dummy metal pattern 340 includes at least one breakpoint 370, which may avoid an excessive amount of capacitance change when the metal mesh 320 in the channel and the second dummy metal pattern 340 are short-circuited, resulting in an error in the detection of the touch point. It may also avoid the short circuit between the metal mesh 320 of the two adjacent conductive channel regions 310 due to the unintended contact between the metal mesh 320 and the second dummy metal pattern 340, resulting in failure of the touch device. Besides, the design of the second dummy metal pattern 340 including at least one breakpoint 370 may also reduce the influence of the metal mesh 320 in the touch panel being in contact with the second dummy metal pattern 340 due to bending in the flexible panels. The material of the second dummy metal pattern 340 may be copper, silver, gold, tin, silver halide or combinations thereof, and may be same as or different from the material of the first dummy metal pattern 330.

The second dummy metal pattern 340 may include repeated regular polygons or irregular polygons, such as triangle, quadrilateral, pentagon or hexagon. In one embodiment, the shape of the second dummy metal pattern 340 is same as the first dummy metal pattern 330. It is to be understood that FIG. 3 merely illustrates one embodiment in the present disclosure, and not intend to limit the shapes or styles of the metal mesh 320, the first dummy metal pattern 330 and the second dummy metal pattern 340.

It is necessary to consider the visibility of the configuration of the first dummy metal pattern 330 and the second dummy metal pattern 340 when using in the touch devices, therefore the line widths of the first dummy metal pattern 330 and the second dummy metal pattern 340 need to be reduced to a degree that the users cannot observe easily. The better line width is less than or equal to 5 μm, and the more better line width is less than or equal to 3 μm, much better is less than or equal to 1 μm. The line widths of the first dummy metal pattern 330 and the second dummy metal pattern 340 may be the same or different. It is noted that the metal mesh 320, the first dummy metal pattern 330 and the second dummy metal pattern 340 in FIG. 3 are illustrated with different line widths just to make it easier to distinguish from each other, and not intend to limit the line widths of the metal mesh 320, the first dummy metal pattern 330 and the second dummy metal pattern 340.

In order to make the metal mesh 320 be insulated from the first dummy metal pattern 330, the distance X of the breakpoint 350 in the first dummy metal pattern 330 needs to be greater than the line width of the metal mesh 320. For example, if the line width of the metal mesh 320 is 5 μm, the distance X of the breakpoint 350 needs to be greater than 5 μm, so that the breakpoint 350 has a sufficient distance to allow the first dummy metal pattern 330 and the metal mesh 320 not in direct contact with each other, and thus electrically insulated from each other. The distance X of each breakpoint in the first dummy metal pattern 330 may be the same or different in some embodiments.

The distance Y of the breakpoint 370 of the second dummy metal pattern 340 doesn't need to be greater than the line width of the metal mesh 320. In other words, the distance Y of the breakpoint 370 may be greater than, equal to or less than the distance X of the breakpoint 350. The distance Y of each breakpoint 370 in the second dummy metal pattern 340 may be the same or different.

The areas surrounded by the metal mesh unit 360 are substantially the same in the conductive channel region 310 in one embodiment. Accordingly, when the metal mesh 320 is deployed with the display panel, the metal mesh unit 360 has same masking effect for each pixel so that the aperture ratio of each pixel remains the same, preventing the "mura effect". On the contrary, if the masking effect for each pixel is different, the brightness of the display panel would be uneven, affecting the user experience.

Figure 4:
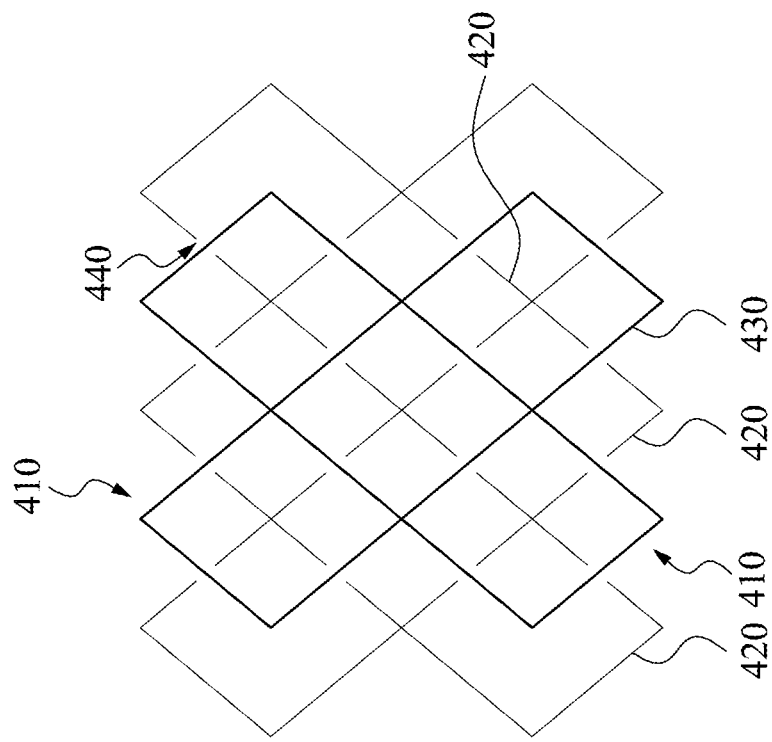
FIG. 4 is a top view illustrating the partial conductive channel region according to an embodiment of the present disclosure.

FIG. 4 is a top view illustrating the partial conductive channel region according to an embodiment of the present disclosure. In the embodiment, a metal mesh 410 includes a plurality of metal mesh units 430. The shape of the metal mesh unit 430 is rhombus, and a first dummy metal pattern 420 includes repeated rhombuses same as the metal mesh units 430. The metal mesh 410 and the first dummy metal pattern 420 are insulated from each other. The first dummy metal pattern 420 and the metal mesh 410 are intersected at the midpoint of each side of the metal mesh unit 430. It is noted that the first dummy metal pattern 420 is not substantially in contact with the metal mesh 410 due to a breakpoint 440 disposed at the intersection of the first dummy metal pattern 420 and the metal mesh 410. The metal mesh 410 is cut off by the breakpoint 440. The metal mesh 410 and the first dummy metal pattern 420 do not overlap each other. The metal mesh 410 and the first dummy metal pattern 420 are in the same layer. In addition, the vertices of the two adjacent rhombic patterns in the first dummy metal pattern 420 overlap at the center of the metal mesh unit 430 between the two adjacent rhombic patterns, the center is the intersection of two opposite vertices of the rhombuses.

It is noted that the metal mesh and the first dummy metal pattern in FIG. 4 are illustrated with different line widths just to make it easier to distinguish from each other, and not intend to limit the line widths of the metal mesh and the first dummy metal pattern. In other words, the line width of the metal mesh may be greater than, equal to or less than that of the first dummy metal pattern.

Figure 5:
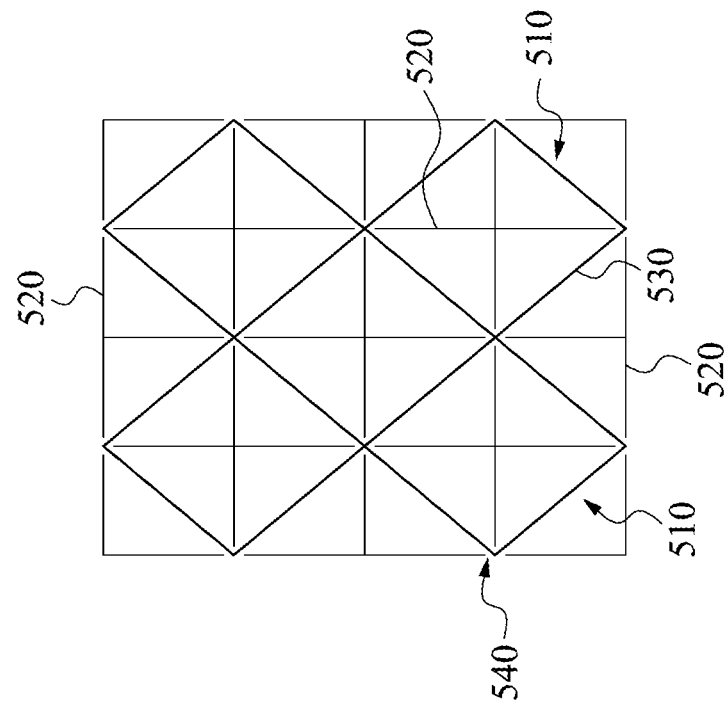
FIG. 5 is a top view illustrating the partial conductive region according to an embodiment of the present disclosure.

Please refer to FIG. 5, which illustrates a top view of the partial conductive region in accordance with another embodiment of the present disclosure. A metal mesh 510 includes a plurality of metal mesh units 530 in FIG. 5. The area surrounded by the metal mesh unit 530 is rhombus, and is similar to the metal mesh unit 430 in FIG. 4. The difference between FIG. 4 and FIG. 5 is the first dummy metal pattern 520 in FIG. 5 includes repeated rectangles. The length and width of the rectangle are substantially equal to the respective diagonal length of the metal mesh unit 530. The first dummy metal pattern 520 and the metal mesh 510 intersect at the vertices of the metal mesh 510. There is a breakpoint 540 in the first dummy metal pattern 520 at the intersection, in order to make the metal mesh 510 and the first dummy metal pattern 520 be insulated from each other, instead of being in contact with each other. The metal mesh 510 and the first dummy metal pattern 520 do not overlap each other.

It is noted that the metal mesh and the first dummy metal pattern in FIG. 5 are illustrated with different line widths just to make it easier to distinguish from each other, and not intend to limit the line widths of the metal mesh and the first dummy metal pattern. In other words, the line width of the metal mesh may be greater than, equal to or less than the first dummy metal pattern.

Figure 6:
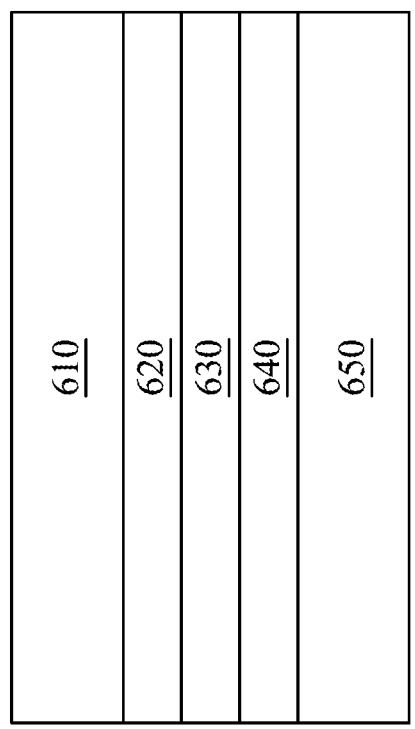
FIG. 6 is a cross-sectional view illustrating the touch layer according to an embodiment of the present disclosure.

In certain embodiments, the first dummy metal pattern may be disposed on a different surface from the metal mesh. Please refer to FIG. 6, which illustrates a cross-sectional view of the touch layer in another embodiment. The touch layer includes a first metal mesh layer 610, a substrate 620, a dummy metal layer 630, a substrate 640 and a second metal mesh layer 650 in FIG. 6. In the embodiment, the first dummy metal pattern (not shown) is disposed in the dummy metal layer 630, instead of being disposed in the first metal mesh layer 610 or the second metal mesh layer 650. The dummy metal layer 630 is disposed between the substrate 620 and 640. The first metal mesh layer 610 includes a metal mesh (not shown) and a second dummy metal pattern (not shown). In the embodiment, the metal mesh of the first metal mesh layer 610 and the metal mesh of the second metal mesh layer 650 are similar to the metal mesh 410 in FIG. 4 or the metal mesh 510 in FIG. 5, and will not be repeated hereinafter. The first dummy metal pattern of the dummy metal layer 630 is similar to the first dummy metal pattern 420 in FIG. 4 or the first dummy metal pattern 520 in FIG. 5. It is noted that the first dummy metal pattern of the dummy metal layer 630 may not have any breakpoints. In the embodiment, it is not necessary to use the breakpoints to make the metal meshes of the first dummy metal pattern and the first metal mesh layer 610 or the second metal mesh layer 650 be electrically insulated since they are not coplanar and there are the substrate 620 and 640 made of insulating materials between them.

When the users watch the touch layer from the top of the touch layer, the pattern of the first metal mesh layer 610, the second metal mesh layer 650 and the dummy metal layer 630 is similar to, but not limited to, that shown in FIG. 4 or FIG. 5. In other words, the first dummy metal pattern disposed in the dummy metal layer 630 may have the effect of reducing the visibility of the metal meshes of the first metal mesh layer 610 and the second metal mesh layer 650. The metal mesh of the first metal mesh layer 610 and the second metal mesh layer 650 can be aligned or misaligned. In certain embodiments, the metal mesh, the first dummy metal pattern and the second dummy metal pattern may include repeated regular polygon or irregular polygon, such as triangle, quadrilateral, pentagon or hexagon. In one embodiment, the second dummy metal pattern (not shown) in the first metal mesh layer 610 and the second dummy metal pattern (not shown) in the second metal mesh layer 650 are similar to the first dummy metal pattern in the dummy metal layer 630, but the second dummy metal pattern (not shown) in the first metal mesh layer 610 and the second dummy metal pattern (not shown) in the second metal mesh layer 650 have at least one breakpoint.

In summary, the present disclosure provides a touch panel which can reduce the visible risk of the metal mesh and fulfill the requirement of lower line impedance in the future. The touch panel provided in the present disclosure may be used for any stylus, such as active stylus, passive stylus or mixed stylus. The touch sensing line has a better effect and lower resistance, improving the rate of the touch response because of the lower resistance of the metal mesh, and making the structure of the touch display device thinner, simplifying the process, reducing costs and increasing the yield. Different needs of ultra-narrow borders, borderless, flexible panel can be fulfilled due to the characteristics of the metal mesh.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A touch panel structure, comprising:
   a conductive channel region, comprising:
      a metal mesh being a conductive channel; and
      a first dummy metal pattern, intersecting the metal mesh, wherein the first dummy metal pattern includes at least two breakpoints and at least one metal line, each of the at least two breakpoints is disposed at a vertex of the metal mesh, the at least one metal line is disposed in the metal mesh and extends from one of the at least two breakpoints to another one of the at least two breakpoints, and the metal mesh is separated from the first dummy metal pattern to be insulated there from at said at least two breakpoints; and
   a second dummy metal pattern insulated from and disposed on two sides of the conductive channel region.

2. The touch panel structure of claim 1, further comprising a substrate, wherein the conductive channel region and the second dummy metal pattern are disposed on at least one surface of the substrate.

3. The touch panel structure of claim 1, wherein the first dummy metal pattern comprises at least one metal line.

4. The touch panel structure of claim 1, wherein the second dummy metal pattern comprises at least one breakpoint.

5. The touch panel structure of claim 4, wherein the second dummy metal pattern is insulated from the metal mesh.

6. The touch panel structure of claim 4, wherein the second dummy metal pattern is insulated from the first dummy metal pattern.

7. The touch panel structure of claim 1, wherein the metal mesh has a line width that is less than or equal to 5 µm.

8. The touch panel structure of claim 1, wherein at least one of the first dummy metal pattern and the second dummy metal pattern has a line width that is less than or equal to 5 µm.

9. The touch panel structure of claim 1, wherein the metal mesh has a metal mesh unit which has a shape of rhombus.

10. The touch panel structure of claim 1, wherein the first dummy metal pattern is consisted of a plurality of repeated rhombuses.

\* \* \* \* \*